(12) United States Patent
Gharring

(10) Patent No.: US 11,802,196 B2
(45) Date of Patent: Oct. 31, 2023

(54) TOY PLASTIC COMPOSITION

(71) Applicant: Chad Jeremy Gharring, Temecula, CA (US)

(72) Inventor: Chad Jeremy Gharring, Temecula, CA (US)

(73) Assignee: Boley Corporation, Chino, CA (US)

(*) Notice: Subject to any disclaimer, the term of this patent is extended or adjusted under 35 U.S.C. 154(b) by 21 days.

(21) Appl. No.: 17/566,990

(22) Filed: Dec. 31, 2021

(65) Prior Publication Data

US 2023/0212380 A1    Jul. 6, 2023

(51) Int. Cl.
  *C08L 23/12*    (2006.01)
  *C08K 7/02*     (2006.01)
  *C08L 55/02*    (2006.01)

(52) U.S. Cl.
  CPC .............. *C08L 23/12* (2013.01); *C08K 7/02* (2013.01); *C08L 55/02* (2013.01); *C08L 2207/20* (2013.01); *C08L 2310/00* (2013.01)

(58) Field of Classification Search
  CPC ....... C08L 2207/20; C08L 23/12; C08L 55/02
  See application file for complete search history.

(56) References Cited

FOREIGN PATENT DOCUMENTS

| CN | 102863809 | * | 1/2013 |
| GB | 2316645   | * | 3/1998 |

OTHER PUBLICATIONS

Cheng et al., electronic translation of Chinese patent CH 102863809 Jan. 2013.*

* cited by examiner

*Primary Examiner* — Jeffrey C Mullis
(74) *Attorney, Agent, or Firm* — Joseph Farco

(57) ABSTRACT

A toy product composition may comprise recycled polypropylene that is between 86.0% and 96.0% by weight of the composition, polypropylene that is between 2.79% and 3.11% by weight of the composition, wheat straw fiber that is between 1.86% and 2.08% by weight of the composition, and polypropylene cooling masterbatch comprises between 2.32% and 2.60% by weight of the composition.

20 Claims, No Drawings

TOY PLASTIC COMPOSITION

FIELD OF THE INVENTION

The present invention relates to the field of consumer-friendly plastics for use in toy products.

BACKGROUND

Conventional toy development has strived to move away from use of materials such as wood, textiles, and metal due to costs in materials and manufacturing as well as difficulty of molding these products into desired forms for consumption and play. Wood in particular has numerous creative challenges for toy design as the tools needed to configure shapes therein and coloring of the same are time consuming, costly, and difficult to reproduce on a large scale. This has led to wooden toys making up an ever-increasing size of the toy material marketplace.

Conventional toy development has overwhelmingly resorted to plastics to satisfy the mass production needs that are key to toy manufacturing and businesses and consumer buy-in to a product or line of products. However, conventional plastics have numerous environmentally unfriendly aspects, including, but not limited to, slow environmental degradation, handling waste from disposal of such material (whether in the manufacturing process or in disposal of the finished toy product), and exposure to harmful chemicals with exposure to different environments, such as heat or water, or use of toxic chemicals as additives or in the paints.

Others have explored the use of bio-based plastics like polylactic acid ("PLA"), polyhydroxyalkanoates ("PHA"), starch polymers, and Terratek Flex elastomers made by Green Dot Bioplastics of Emporia, Kansas. However, PLA tends to be more expensive and recycling it is not economically viable. PHA has poor mechanical properties, high production cost, limited functionalities, incompatibility with conventional thermal processing techniques and susceptibility to thermal degradation. Starch polymers are highly sensitive to water and are brittle without plasticizers and other additives. The Terratek Flex elastomers, while biodegradable, are limited to elastic uses.

SUMMARY

An exemplary composition may consist essentially of recycled polypropylene that is between 86.0% and 96.0% by weight of the composition, preferably between 84% and 94% by weight of the composition, polypropylene that is between 2.79% and 3.11% by weight of the composition, preferably between 2.50% and 3.07% by weight of the composition, wheat straw fiber that is between 1.86% and 2.08% by weight of the composition, preferably between 1.60% and 2.05% by weight of the composition, and polypropylene cooling masterbatch comprises between 2.32% and 2.60% by weight of the composition, preferably between 2.20% and 2.55% by weight of the composition.

An exemplary composition may consist essentially of recycled polypropylene that is about 92.0% by weight of the composition, polypropylene that is about 3.0% by weight of the composition, wheat straw fiber that is about 2.0% by weight of the composition, and polypropylene cooling masterbatch that is about 2.5% by weight of the composition.

An exemplary toy product may be made from an exemplary composition consisting essentially of recycled polypropylene that is between 86.0% and 96.0% by weight of the composition, preferably between 84% and 94% by weight of the composition, polypropylene that is between 2.79% and 3.11% by weight of the composition, preferably between 2.50% and 3.07% by weight of the composition, wheat straw fiber that is between 1.86% and 2.08% by weight of the composition, preferably between 1.60% and 2.05% by weight of the composition, and polypropylene cooling masterbatch comprises between 2.32% and 2.60% by weight of the composition, preferably between 2.20% and 2.55% by weight of the composition.

An exemplary toy product may be between 90% and 104% more resistant to destruction testing to the same dimensioned prior art toy product when the exemplary toy product is made from an exemplary composition consisting essentially of recycled polypropylene that is between 86.0% and 96.0% by weight of the composition, preferably between 84% and 94% by weight of the composition, polypropylene that is between 2.79% and 3.11% by weight of the composition, preferably between 2.50% and 3.07% by weight of the composition, wheat straw fiber that is between 1.86% and 2.08% by weight of the composition, preferably between 1.60% and 2.05% by weight of the composition, and polypropylene cooling masterbatch comprises between 2.32% and 2.60% by weight of the composition, preferably between 2.20% and 2.55% by weight of the composition.

An exemplary toy product may be made from an exemplary composition consisting essentially of recycled polypropylene that is about 92.0% by weight of the composition, polypropylene that is about 3.0% by weight of the composition, wheat straw fiber that is about 2.0% by weight of the composition, and polypropylene cooling masterbatch that is about 2.5% by weight of the composition.

An exemplary toy product may be between 90% and 104% more resistant to destruction testing to the same dimensioned prior art toy product when the exemplary toy product is made from an exemplary composition consisting essentially of recycled polypropylene that is about 92.0% by weight of the composition, polypropylene that is about 3.0% by weight of the composition, wheat straw fiber that is about 2.0% by weight of the composition, and polypropylene cooling masterbatch that is about 2.5% by weight of the composition.

An exemplary toy product when formed as a building block may be between 5% and 6% more capable of maintaining its engagement with the same building block as compared to the same dimensioned prior art toy building block products when the exemplary toy product is made from an exemplary composition consisting essentially of recycled polypropylene that is between 86.0% and 96.0% by weight of the composition, preferably between 84% and 94% by weight of the composition, polypropylene that is between 2.79% and 3.11% by weight of the composition, preferably between 2.50% and 3.07% by weight of the composition, wheat straw fiber that is between 1.86% and 2.08% by weight of the composition, preferably between 1.60% and 2.05% by weight of the composition, and polypropylene cooling masterbatch comprises between 2.32% and 2.60% by weight of the composition, preferably between 2.20% and 2.55% by weight of the composition.

An exemplary toy product when formed as a building block may be between 5% and 6% more capable of maintaining its engagement with the same building block as compared to the same dimensioned prior art toy building block products when the exemplary toy product is made from an exemplary composition consisting essentially of recycled polypropylene that is about 92.0% by weight of the composition, polypropylene that is about 3.0% by weight of the composition, wheat straw fiber that is about 2.0% by weight of the composition, and polypropylene cooling masterbatch that is about 2.5% by weight of the composition.

An exemplary composition may comprise recycled polypropylene or acrylonitrile butadiene styrene that is between 86.0% and 96.0% by weight of the composition, preferably about 92.0% by weight of the composition, polypropylene that is between 2.79% and 3.11% by weight of the composition, preferably about 3.0% by weight of the composition, wheat straw fiber that is between 1.86% and 2.08% by weight of the composition, preferably about 2.0% by weight of the composition, and polypropylene cooling masterbatch comprises between 2.32% and 2.60% by weight of the composition, preferably about 2.5% by weight of the composition.

An exemplary toy product may be made from an exemplary composition comprised of recycled polypropylene or acrylonitrile butadiene styrene that is between 86.0% and 96.0% by weight of the composition, preferably about 92.0% by weight of the composition, polypropylene that is between 2.79% and 3.11% by weight of the composition, preferably about 3.0% by weight of the composition, wheat straw fiber that is between 1.86% and 2.08% by weight of the composition, preferably about 2.0% by weight of the composition, and polypropylene cooling masterbatch comprises between 2.32% and 2.60% by weight of the composition, preferably about 2.5% by weight of the composition.

An exemplary toy product may be between 90% and 104% more resistant to destruction testing to the same dimensioned prior art toy product when the exemplary toy product is made from an exemplary composition comprised of recycled polypropylene or acrylonitrile butadiene styrene that is between 86.0% and 96.0% by weight of the composition, preferably about 92.0% by weight of the composition, polypropylene that is between 2.79% and 3.11% by weight of the composition, preferably about 3.0% by weight of the composition, wheat straw fiber that is between 1.86% and 2.08% by weight of the composition, preferably about 2.0% by weight of the composition, and polypropylene cooling masterbatch comprises between 2.32% and 2.60% by weight of the composition, preferably about 2.5% by weight of the composition.

An exemplary toy product when formed as a building block may be between 5% and 6% more capable of maintaining its engagement with the same building block as compared to the same dimensioned prior art toy building block products when the exemplary toy product is made from an exemplary composition comprised of recycled polypropylene or acrylonitrile butadiene styrene that is between 86.0% and 96.0% by weight of the composition, preferably about 92.0% by weight of the composition, polypropylene that is between 2.79% and 3.11% by weight of the composition, preferably about 3.0% by weight of the composition, wheat straw fiber that is between 1.86% and 2.08% by weight of the composition, preferably about 2.0% by weight of the composition, and polypropylene cooling masterbatch comprises between 2.32% and 2.60% by weight of the composition, preferably about 2.5% by weight of the composition.

An exemplary toy product may be between 90% and 104% more resistant to destruction testing to the same dimensioned prior art toy product and, when formed as a building block, may be between 5% and 6% more capable of maintaining its engagement with the same building block as compared to the same dimensioned prior art toy building block products when the exemplary toy product is made from an exemplary composition may consist essentially of recycled polypropylene that is between 86.0% and 96.0% by weight of the composition, preferably between 84% and 94% by weight of the composition, polypropylene that is between 2.79% and 3.11% by weight of the composition, preferably between 2.50% and 3.07% by weight of the composition, wheat straw fiber that is between 1.86% and 2.08% by weight of the composition, preferably between 1.60% and 2.05% by weight of the composition, and polypropylene cooling masterbatch comprises between 2.32% and 2.60% by weight of the composition, preferably between 2.20% and 2.55% by weight of the composition.

An exemplary toy product may be between 90% and 104% more resistant to destruction testing to the same dimensioned prior art toy product and, when formed as a building block, may be between 5% and 6% more capable of maintaining its engagement with the same building block as compared to the same dimensioned prior art toy building block products when the exemplary toy product is made from an exemplary composition may consist essentially of recycled polypropylene that is about 92.0% by weight of the composition, polypropylene that is about 3.0% by weight of the composition, wheat straw fiber that is about 2.0% by weight of the composition, and polypropylene cooling masterbatch that is about 2.5% by weight of the composition.

An exemplary toy product may be between 90% and 104% more resistant to destruction testing to the same dimensioned prior art toy product and, when formed as a building block, may be between 5% and 6% more capable of maintaining its engagement with the same building block as compared to the same dimensioned prior art toy building block products when the exemplary toy product is made from an exemplary composition comprised of recycled polypropylene or acrylonitrile butadiene styrene that is between 86.0% and 96.0% by weight of the composition, preferably about 92.0% by weight of the composition, polypropylene that is between 2.79% and 3.11% by weight of the composition, preferably about 3.0% by weight of the composition, wheat straw fiber that is between 1.86% and 2.08% by weight of the composition, preferably about 2.0% by weight of the composition, and polypropylene cooling masterbatch comprises between 2.32% and 2.60% by weight of the composition, preferably about 2.5% by weight of the composition.

An exemplary composition consisting essentially of recycled polypropylene that is about 92.0% by weight of the composition, polypropylene that is about 3.0% by weight of the composition, wheat straw fiber that is about 2.0% by weight of the composition, and polypropylene cooling masterbatch that is about 2.5% by weight of the composition may surprisingly provide for toy product fabrication material that has at least all of the same structural attributes or better attributes as compared to prior art toy product fabrication material but with a marked decrease in environmental impact when manufactured and/or disposed.

DETAILED DESCRIPTION

An exemplary composition may comprise differing amounts of polypropylene ("PP"), recycled PP ("RPP"), wheat straw fiber ("WSF"), and PP cooling masterbatch. In an alternative embodiment, the exemplary composition may also include and/or be substituted to include acrylonitrile butadiene styrene ("ABS"). In one embodiment, ABS may be substituted for RPP and may comprise the same or similar weight percentage proportions in the final composition as RPP. ABS may be especially suitable for use where the final composition requires colors beyond white or gray (e.g., for painting the final composition).

In an exemplary embodiment, the PP may be supplied as virgin polypropylene as offered by Birch Plastics, Inc. of Houston, Texas. The RPP may also be supplied by Birch Plastics, Inc. of Houston, Texas. The PP cooling masterbatch may be supplied by Hubron International Ltd., United Kingdom.

In an exemplary embodiment, the amount of RPP comprises between 86.0% and 96.0% by weight of the composition, PP comprises between 2.79% and 3.11% by weight of the composition, WSF comprises between 1.86% and 2.08% by weight of the composition, and PP cooling masterbatch comprises between 2.32% and 2.60% by weight of the composition.

In another exemplary embodiment, an exemplary composition comprises 92.5% RPP by weight of the composition, 3% PP by weight of the composition, 2% WSF by weight of the composition, and 2.5% PP cooling masterbatch by weight of the composition.

According to an exemplary embodiment, the components may be ground up and/or add-mixed in a blender or other mixing facility. Alternatively, the materials may be liquified and mixed in appropriate receptacles for final disposition. Any number of mixing and processing techniques known to those skilled in the art may be utilized to make the composition in accordance with the component specifications provided above.

In another exemplary embodiment, the PP may be added at temperatures less than or equal to 200° C. to avoid burning the material, which is in contrast to injection of PP in other products that takes place at temperatures at or above 230° C. According to this exemplary embodiment, the add-mixing of cooling masterbatch with the PP may allow the PP to melt properly at the lower temperature (e.g., at or below 200° C., or preferably around 200° C.).

For use in toy products, the above exemplary composition(s) pass one or more of the following safety guidelines and specifications: U.S. ASTM F963-17, 16 CFR 1250, 16 CFR 1500.18, 16 CFR 1500.50, 16 CFR 1500.53, 16 CFR 1500.87-1500.91, 16 CFR 1501, 16 CFR 1303, 16 CFR 1307-1308, 16 CFR 1199. As used in an exemplary building block toy product, the above exemplary compositions pass all required mechanical and chemical testing, including destructive testing and durability testing.

When a composition is composed as disclosed herein, the resulting products made thereby are substantially phthalate free, lead free, free of heavy metal elements (as per section 4.3.5 of the ASTM Standard Consumer Safety Specification on Toy Safety F963-17). Furthermore, the products when subjected to destruction testing and playability testing showed the same if not improved performance characteristics compared to the prior art.

Destruction Testing

Destruction testing was performed by crushing a building block product made by Mega Bloks® with a building block product of substantially identical dimensions composed of the inventive composition disclosed herein. The testing involved applying a press to each sample on its top and side surfaces using an Instron Model 5566, S/N: 5566Q3079, with a calibration due date of Mar. 30, 2022.

When crushed from the top, the Mega Bloks® sample was able to withstand a peak load of 573.9 lbf. When crushed from the side, the Mega Bloks® sample was able to withstand a peak load of 390.7 lbf. In contrast, when the product composed of the sample composition was crushed from the top, the inventive sample was able to withstand a peak load of 1,175.4 lbf. When crushed from the side, the inventive sample was able to withstand a peak load of 743.2 lbf.

As a result of this test, a product composed of the inventive composition had the same if not better destruction resistance as compared to the prior art.

Playability Testing

Playability testing was performed by separating two fully engaged samples of building blocks made by Mega Bloks® and the same building blocks made by the inventive composition. The testing was conducted using an Instron Model 5566, S/N: 5566Q3079, with a calibration due date of Mar. 30, 2022. The purpose of the playability test was to determine as between building block toys whether the inventive composition led to any loss in the ability of the material to friction fit and not be too easily removed and thereby reduce the ability to build a product thereby.

When the first Mega Blok® building block was pulled away from the second Mega Blok®, the forces required were 1.39 lbf, 1.41 lbf, and 1.43 lbf, for an average of 1.41 lbf. When the first building block made from the inventive composition was pulled away from the second building block made from the inventive composition, the forces required were 1.48 lbf, 1.52 lbf, and 1.52 lbf, for an average of 1.507 lbf.

As a result of this test, a product composed of the inventive composition had the same if not better playability as compared to the prior art.

Further, the product composed of the inventive composition also provides the additional advantage of reducing the quantity of virgin plastic needed to produce products in accordance with the above features. In this way, the product composition offers a more environmentally friendly alternative to known product compositions, in particular, toy product compositions.

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A composition, consisting essentially of recycled polypropylene that is between 84.0% and 96.0% by weight of the composition, polypropylene that is between 2.50% and 3.11% by weight of the composition, wheat straw fiber that is between 1.60% and 2.08% by weight of the composition, and polypropylene cooling masterbatch comprises between 2.20% and 2.60% by weight of the composition.

2. The composition of claim 1, wherein the recycled polypropylene is between 86% and 94% by weight of the composition.

3. The composition of claim 1, wherein the polypropylene is between 2.790% and 3.07% by weight of the composition.

4. The composition of claim 1, wherein the wheat straw fiber is between 1.86% and 2.05% by weight of the composition.

5. The composition of claim 1, wherein the polypropylene cooling masterbatch is between 2.32% and 2.55% by weight of the composition.

6. The composition of claim 1, wherein the recycled polypropylene is between 86% and 94% by weight of the composition and the polypropylene is between 2.79% and 3.07% by weight of the composition.

7. The composition of claim 6, wherein the wheat straw fiber is between 1.86% and 2.05% by weight of the composition.

8. The composition of claim 6, wherein the polypropylene cooling masterbatch is between 2.32% and 2.55% by weight of the composition.

9. The composition of claim 1, wherein the recycled polypropylene is about 92.0% by weight of the composition and the polypropylene is about 3.0% by weight of the composition.

10. The composition of claim 9, wherein the wheat straw fiber is between 1.86% and 2.05% by weight of the composition.

11. The composition of claim 9, wherein the polypropylene cooling masterbatch is between 2.32% and 2.55% by weight of the composition.

12. The composition of claim 1, wherein the recycled polypropylene is about 92.0% by weight of the composition, the polypropylene is about 3.0% by weight of the composition, the wheat straw fiber is about 2.0% by weight of the composition, and the polypropylene cooling masterbatch is about 2.5% by weight of the composition.

13. A toy product made with the composition of claim 1.

14. A toy product made with the composition of claim 9.

15. A toy product made with the composition of claim 12.

16. A composition, comprising: recycled polypropylene or acrylonitrile butadiene styrene that is between 84.0% and 96.0% by weight of the composition, polypropylene that is between 2.59% and 3.11% by weight of the composition, wheat straw fiber that is between 1.69% and 2.08% by weight of the composition, and polypropylene cooling masterbatch comprises between 2.20% and 2.60% by weight of the composition.

17. The composition of claim 16, wherein either the recycled polypropylene or the acrylonitrile butadiene styrene is about 92.0% by weight of the composition, the polypropylene is about 3.0% by weight of the composition, the wheat straw fiber is about 2.0% by weight of the composition, and the polypropylene cooling masterbatch is about 2.5% by weight of the composition.

18. The composition of claim 17, wherein acrylonitrile butadiene styrene is about 92.0% by weight of the composition.

19. A toy product made with the composition of claim 16.

20. A toy product made with the composition of claim 18.

* * * * *